(12) United States Patent
Lin

(10) Patent No.: US 7,168,336 B2
(45) Date of Patent: Jan. 30, 2007

(54) TRANSMISSION MECHANISM IN SLOT-IN DRIVE

(75) Inventor: Hung-Jui Lin, Taipei (TW)

(73) Assignee: EPO Science & Technology Inc., Taipei (TW)

( * ) Notice: Subject to any disclaimer, the term of this patent is extended or adjusted under 35 U.S.C. 154(b) by 307 days.

(21) Appl. No.: 10/860,000

(22) Filed: Jun. 4, 2004

(65) Prior Publication Data

US 2005/0268738 A1   Dec. 8, 2005

(51) Int. Cl.
*F16H 1/20* (2006.01)
(52) U.S. Cl. .................. 74/413; 74/421 A; 74/406
(58) Field of Classification Search .............. 74/414, 74/412, 413, 89.17, 421 A, 421 R
See application file for complete search history.

(56) References Cited

U.S. PATENT DOCUMENTS

| | | | | |
|---|---|---|---|---|
| 3,227,420 A | * | 1/1966 | Scott | ................. 254/284 |
| 3,921,470 A | * | 11/1975 | Mabuchi | ................. 74/414 |
| 4,779,257 A | * | 10/1988 | Matsumoto | ................. 720/604 |
| 5,198,933 A | * | 3/1993 | Matsushita et al. | ....... 360/99.06 |
| 5,262,909 A | * | 11/1993 | Chiou et al. | ................. 360/85 |
| 2004/0103419 A1 | * | 5/2004 | Kuo et al. | ................. 720/619 |

* cited by examiner

*Primary Examiner*—Richard Ridley
*Assistant Examiner*—Justin Krause
(74) *Attorney, Agent, or Firm*—Troxell Law Office, PLLC

(57) ABSTRACT

A transmission mechanism in a slot-in drive comprises a chassis respectively connected to a motor, worm, worm gear and a plurality of spur gears, a rubber roller, transmission sheet and control sheet, in which one of the spur gears and the rubber roller are connected to a same rotating shaft and can be driven by the adjacent spur gear; another spur gear can drive a rack of the transmission sheet to allow the transmission sheet to drive the control sheet to move; fewer components are installed in the whole structure, the assembly and the manufacturing are easier and the production cost can be reduced.

5 Claims, 3 Drawing Sheets

TRANSMISSION MECHANISM IN SLOT-IN DRIVE

BACKGROUND OF THE INVENTION

1. Field of the Invention

The present invention relates to a transmission mechanism in a slot-in drive, and more particularly to a transmission mechanism used to drive a disc to move in or out of a chassis and drive a clamper to move up and down to enter or retreat from a location to clamp or separate from a disc.

2. Description of Related Art

Please refer to FIGS. 1, 2 and 3. A conventional transmission mechanism in a slot-in drive comprises a chassis 1 respectively connected to first, second, third and fourth worms 12, 13, 14 and 18, a first worm gear installed at the lower side of the third worm 14 (not shown in the figure), first, second, third, fourth, fifth and sixth spur gears 15, 16, 17, 20, 21 and 22, a second worm gear 19 and rubber roller. The driving shaft of the motor 11 is connected to a pulley 111, the flank side of the first worm 12 is also connected to a pulley 121 and the two ends of a transmission belt are respectively connected to the pulleys 111 and 121 to allow the motor 11 to drive the first worm 12 to rotate. The upper end of the first worm 12 is engaged with the second worm 13 and the second worm 13 and the third worm 14 are mutually connected to one end of a rotating shaft 25; one end of the rotating shaft 25 has a section 26 with a larger diameter connected to the fourth worm 18. Therefore, the first worm 12 can drive the second, the third and the fourth worms 13, 14 and 18 to rotate. The lower end of the third worm 14 is engaged with the first worm gear; the first worm gear and the first spur gear 15 are formed into one body so that the third worm 14 can drive the first worm gear and the first spur gear 15 to rotate. The side end of the first spur gear 15 is engaged with the second spur gear 16; the second spur gear 16 and the third spur gear 17 are formed into one body so that the first spur gear 15 can drive the second spur gear 16 and the third spur gear 17 to rotate. The lower end of the third spur gear 17 can be engaged with a rack of a moving sheet below the third spur gear (not shown in the figure) so that the moving sheet can be driven to move. The lower end of the fourth worm 18 is engaged with the second worm gear 19; the second worm gear 19 and the fourth spur gear 20 are formed into one body so that the fourth worm 18 can drive the second worm gear 19 and the fourth spur gear 20 to rotate. The side end of the fourth spur gear 20 is engaged with fifth spur gear 21 so that the fifth spur gear 21 can be driven to move. The sixth spur gear 22 and the rubber roller 23 are mutually connected to a rotating shaft 27. A longitudinal long hole 281 is disposed in a side wall 28 of the chassis 1 and a control sheet 29 is installed outside of the side wall 28; a hole 291 corresponding to the long hole 281 is disposed in the control sheet 29 and a slanted wall 292 inclined downward is formed in the hole 291. One end of the rotating shaft 27 is projected out of the long hole 281 and the hole 291 and propped against the upper end of the slanted wall 292. The moving sheet mentioned above can drive the control sheet 29 to move at the right or the left direction shown in FIG. 2.

Please refer to FIGS. 1 and 2. When the bottom end of the slanted wall 292 is positioned at the bottom end of the long hole 281, the rotating shaft 27 is caused to prop against the lower end of the slanted wall 292 through the pull force of a spring. In the meantime, the fifth spur gear 21 is engaged with the sixth spur gear 22 so that the rubber roller 11 can be driven to rotate to drive a disc to enter or separate from the inside part of the chassis 1.

Please refer to FIGS. 1 and 3. When the slanted wall 292 is moved toward the left direction of the figures, it drives the rubber roller 11 to move upward to cause the rubber roller 23 not to be rotated when the fifth spur gear 21 is not engaged with the sixth spur gear 22. A clamper controlling mechanism can be further driven to cause the clamper to separate or clamp the disc by driving the moving sheet or control sheet to move.

Four worms, two worm gears, six spur gears, rotating shafts connected with worms and etc must be used in the transmission mechanism mentioned above, and they are totally ten components need to be manufactured respectively with a mold so that the structure thereof is complex, the assembly thereof is time consuming and the production cost thereof is high because each component is respectively manufactured. For simplifying the structure of the structure of the transmission mechanism of a slot-in drive, reducing the components and saving the production cost, the present invention is proposed.

SUMMARY OF THE INVENTION

The main object of the present invention is to provide a transmission mechanism in a slot-in drive, more spur gears rather than worms/worm gears are used so that it is easier to be manufactured and assembled.

Another object of the present invention is to provide a transmission mechanism in a slot-in drive; the components thereof are less so that the production cost is lower.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
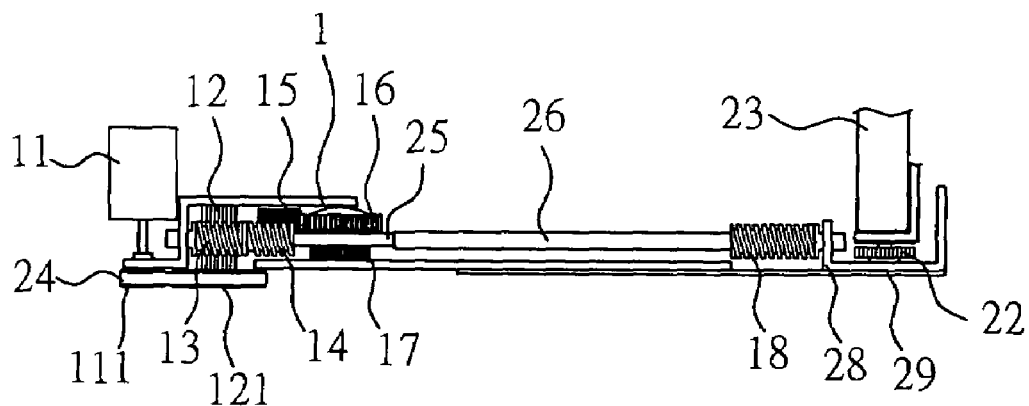
FIG. 1 is a plane schematic view, showing a transmission mechanism in a slot-in drive of the prior art.
Figure 2:
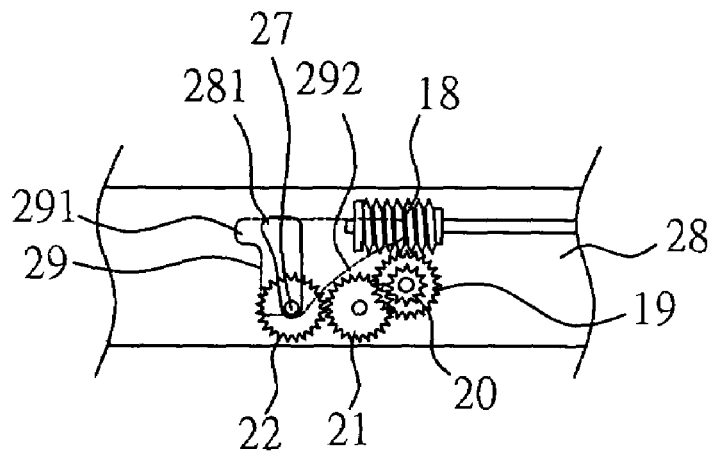
FIG. 2 is a schematic view, showing that a rubber roller is driven by a transmission mechanism in a slot-in drive of the prior art.
Figure 3:
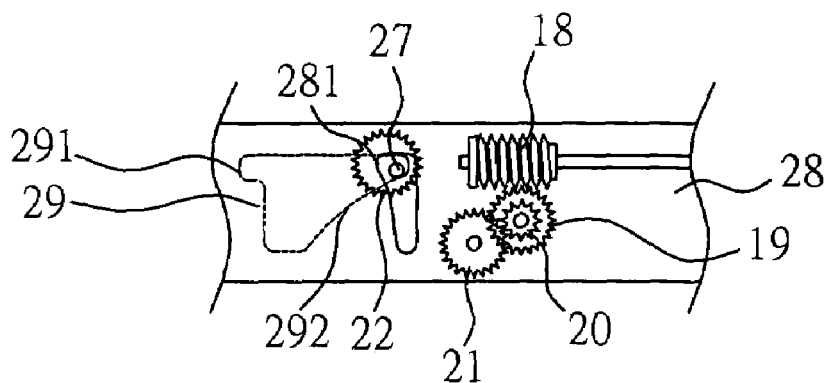
FIG. 3 is a schematic view, showing a rubber roller is not driven by a transmission mechanism in a slot-in drive of the prior art.
Figure 4:
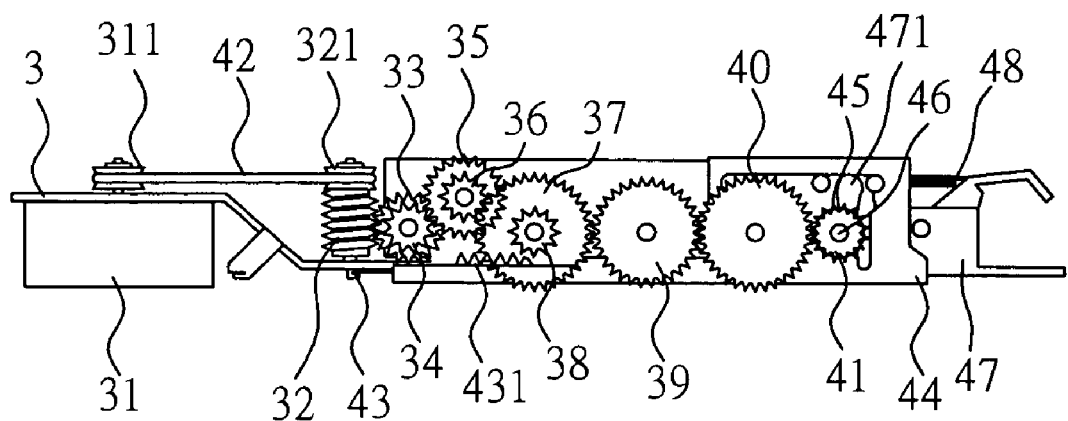
FIG. 4 is a plane schematic view, showing that a rubber roller is driven by a transmission mechanism in a slot-in drive according to the present invention.
Figure 5:
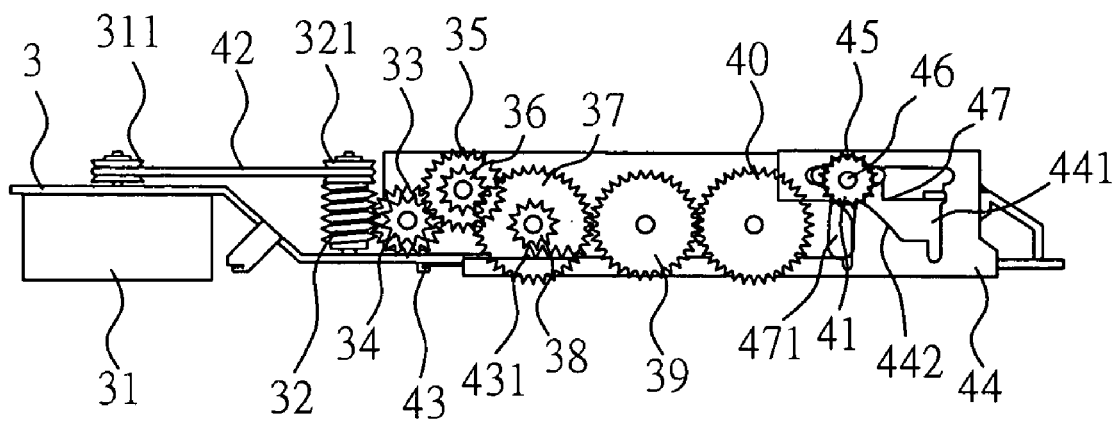
FIG. 5 is a plane schematic view, showing a rubber roller is not driven by a transmission mechanism in a slot-in drive according to the present invention.

Please refer to FIGS. 4 and 5, a transmission mechanism in a slot-in drive according to the present invention comprises a chassis 3 respectively connected to a motor 31, worm 32, worm gear 33, first, second, third, fourth, fifth, sixth, seventh and eighth spur gears 34, 35, 36, 37, 38, 39, 40 and 41 and a rubber roller 45. A driving shaft of the motor 31 and side of worm 32 are respectively connected to the pulleys 311 and 321. The two ends of a driving belt 42 are respectively combined with the pulleys 311 and 321 to allow the motor 31 to drive the worm 32 to rotate. The worm gear 33 and the first spur gear 34, the second and the third spur gears 35 and 36, and the fourth and the fifth spur gears are respectively formed into one body and combined mutually with a rotating shaft so as to be able to be rotated concurrently. The worm 32 is engaged with the worm gear 33 and the first spur gear 34 is engaged with the second spur gear 35. The third spur gear 36, the fourth spur gear 37, the sixth spur gear 39 and the seventh spur gear are engaged with each other in a sequence to allow the motor 31 to be able to drive the worm 32, the worm gear 33 and the first to the seventh spur gears to rotate. The motor 31 can also drive the worm 32 to rotate through the spur gear train. Another spur gear train can be used to replace the worm 32 and the worm gear to drive the first spur gear 34.

Figure 6:
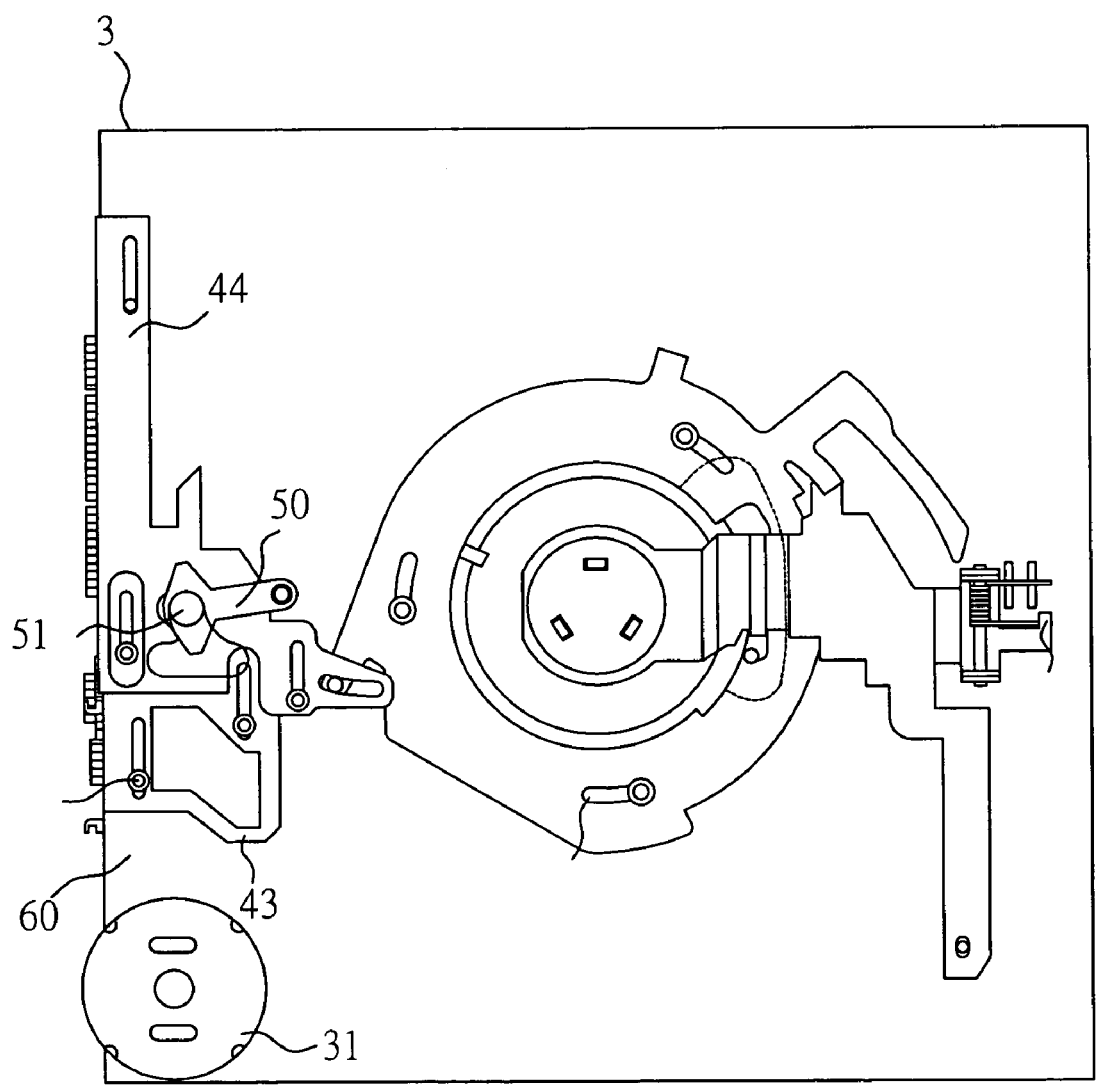
FIG. 6 is a plane schematic view, showing that a transmission sheet is connected to a control sheet according to the present invention.

Furthermore, the chassis 3 is connected to a transmission sheet 43 and a control sheet 44. A rack 431 is disposed in the transmission sheet 43; the rack 431 can be moved into the location that the fifth spur gear 38 is engaged therewith to be driven by the fifth gear 38 to move in the right direction of FIG. 4. The eighth spur gear 41 and the rubber roller 45 are connected to a same rotating shaft 46. A longitudinal long hole 471 is opened in a side wall 47 of the chassis 3; a hole 441 corresponding to the long hole 471 is opened in the control sheet outside of the side wall 47; a upward inclined wall 442 is disposed in the hole 441. The rotating shaft 46 is propped against the inclined wall 442. Please refer to FIG. 6. Slots are respectively disposed in the transmission sheet 43 and the control sheet 44 and are engaged with a guide pin 51 of a moving sheet 50 to allow the transmission sheet 43 to drive the control sheet 44 to move in a same direction. The other end of the moving sheet 50 is connected pivotally to a ceiling plate 60 of the chassis 3. A clamper controlling mechanism can be further driven by driving the moving sheet 43 or the control sheet 44 to move to cause a clamper to separate from or clamp a disc.

Please refer to FIGS. 4 and 5 again. When the lower end of the inclined wall 442 is positioned at the bottom end of the long hole 471, the rotating shaft 46 is caused to prop against the lower end of the inclined wall 442 through the force of a spring 48. In the meantime, the seventh spur gear 40 is engaged with the eighth spur gear to drive the rubber roller 45 to rotate and further to drive the disc to enter or leave the inside part of the chassis 3.

When the control sheet 44 is moved toward the right direction shown in FIG. 4, the inclined wall 442 is caused to drive the rotating shaft 46 to move upward to allow the rubber roller not to be rotated when the seventh spur gear 40 is not engaged with the eighth spur gear 41.

The structure of worms and worm gears is more complex than one of spur gears and is manufactured more difficultly so that the price thereof is higher. The characteristic of the present invention is to replace more expensive worms and worm gears with a plurality of cheaper spur gears for a transmission mechanism. Only one worm, one worm gear and eight spur gears are used in the transmission mechanism according to the present invention; although it has two more spur gears than the conventional transmission mentioned above, but one worm gear and three worms are less needed. Besides, because space-occupying rotating shafts are not needed to connect with worms in the transmission mechanism according to the present invention, the structure of whole transmission mechanism needs seven components and is three components less than the conventional transmission mechanism mentioned above so that the space is saved, the assembly time is saved and the production cost is reduced. Only one worm and one worm gear is used according to the present invention, the total price of the components used in the transmission mechanism according to the present invention is lower comparing with the conventional transmission mechanism mentioned above needing three worms and two worm gears.

It is noted that the transmission mechanism in a slot-in drive described above is the preferred embodiment of the present invention for the purpose of illustration only, and are not intended as a definition of the limits and scope of the invention disclosed. Any modifications and variations that maybe apparent to a person skilled in the art are intended to be included within the scope of the present invention.

What is claimed is:

1. A transmission mechanism in a slot-in drive comprising: a chassis to which are respectively connected a first, second, third, fourth, fifth, sixth and seventh spur gears; said second and said third spur gears being combined on one rotating shaft, and said fourth and said fifth spur gears being respectively combined with another rotating shaft; said first spur gear being engaged with said second spur gear; said third, said fourth, said sixth and said seventh spur gears being engaged with each other in a sequence; wherein said second through said seventh spur gears being driven to rotate concurrently when said first spur gear is rotated;

the transmission mechanism further comprising a worm and worm gear connected to said chassis; said worm gear and said first spur gear are mutually connected to a rotating shaft; said worm is engaged with said worm gear; wherein said worm gear and said spur gear are driven to rotate concurrently when said worm is rotated;

the transmission mechanism further comprising an eighth spur gear, a rubber roller and a control sheet connected to said chassis; said eighth spur gear is positioned beside said seventh spur gear; a longitudinal hole is opened in a side wall of said chassis, a hole corresponding to said longitudinal hole is opened in said control sheet outside of said side wall, an inclined wall is disposed as a sidewall of said hole; said eighth spur gear and said rubber roller are connected to a same rotating shaft, said rotating shaft is positioned in said longitudinal hole and pressed against the upper end of said inclined wall wherein said eighth spur gear is caused to separate from said seventh spur gear engaged therewith.

2. The transmission mechanism according to claim 1, wherein said worm gear and said first spur gear, said second and said third spur gears, said fourth and said fifth spur gears are respectively formed as one body.

3. The transmission mechanism according to claim 1, further comprising a motor, a driving shaft of said motor connected to said chassis and a flank side of said worm are each respectively combined with one of two pulleys and both ends of a transmission belt are respectively connected to said pulleys.

4. The transmission mechanism according to claim 1, further comprising a transmission sheet connected to said chassis, a rack is disposed on said transmission sheet; wherein said rack is driven by said fifth spur gear while being moved into a location that said fifth spur gear is engaged therewith.

5. The transmission mechanism according to claim 4, wherein a ceiling plate of said chassis is connected pivotally to a moving sheet, a guide pin is combined with said moving sheet; slots are respectively disposed in said transmission sheet and said control sheet, said guide pin is engaged in said two slots; wherein said transmission sheet is caused to drive said control sheet.

* * * * *